(12) United States Patent
Odaka et al.

(10) Patent No.: US 7,147,272 B2
(45) Date of Patent: Dec. 12, 2006

(54) VEHICLE BODY FLOOR STRUCTURE

(75) Inventors: Isao Odaka, Sagamihara (JP); Hiroshi Uchida, Yamato (JP); Kenji Takada, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 30 days.

(21) Appl. No.: 11/055,596

(22) Filed: Feb. 11, 2005

(65) Prior Publication Data
US 2005/0194818 A1   Sep. 8, 2005

(30) Foreign Application Priority Data
Mar. 2, 2004   (JP)   ............ P 2004-057969

(51) Int. Cl.
*B62D 25/20* (2006.01)
(52) U.S. Cl. ................................. 296/187.12
(58) Field of Classification Search ........... 296/187.12, 296/187.03, 193.05, 193.07, 203.01, 204, 296/203.03, 29, 30, 1.04; 180/311
See application file for complete search history.

(56) References Cited
U.S. PATENT DOCUMENTS

| | | | | |
|---|---|---|---|---|
| 3,132,891 | A * | 5/1964 | Pyuro et al. ................ | 296/204 |
| 5,125,715 | A * | 6/1992 | Kijima ................... | 296/187.09 |
| 5,370,438 | A * | 12/1994 | Mori et al. ............ | 296/203.02 |
| 6,053,564 | A * | 4/2000 | Kamata et al. ......... | 296/187.09 |
| 6,428,085 | B1 * | 8/2002 | Miyasaka et al. ....... | 296/187.12 |
| 6,709,047 | B1 * | 3/2004 | Burge ......................... | 296/209 |
| 6,834,912 | B1 * | 12/2004 | Cardimen et al. .......... | 296/204 |
| 6,857,692 | B1 * | 2/2005 | Cardimen et al. .......... | 296/204 |

FOREIGN PATENT DOCUMENTS

JP   2000-203449 A   7/2000

* cited by examiner

*Primary Examiner*—H Gutman
(74) *Attorney, Agent, or Firm*—McDermott Will & Emery LLP

(57) ABSTRACT

A vehicle body floor structure is provided with a floor, a side sill extendedly arranged at a side of the floor and in a longitudinal direction of a vehicle body to have a closed section, a pair of floor cross members extendedly arranged on the floor in a widthwise direction of the vehicle body, so as to face with each other in the longitudinal direction of the vehicle body, and a first reinforcing member, provided between the pair of floor cross members in the longitudinal direction of the vehicle body and within the closed section of the side sill, to exhibit property allowing a dimensional condition thereof to be maintained against a side collision load.

9 Claims, 3 Drawing Sheets though, according to studies conducted by the present inventors of the present invention, in such a structure, installation of reinforcing members ensures rigidity in a part corresponding to end portions of floor cross members of side sills. However, at the time of a side collision of a vehicle, if a side collision load is inputted in the side sill between a pair of front and rear floor cross members, the side sill is possibly deformed by bending toward the inside in a widthwise direction of a vehicle body in a V-shape in plan view.

VEHICLE BODY FLOOR STRUCTURE

BACKGROUND OF THE INVENTION

The present invention relates to a vehicle body floor structure, and particularly to a vehicle body floor structure of an automobile.

Japanese Patent Application Laid-Open Publication 2000-203449 (see page 4 and FIG. 1) discloses the vehicle body floor structure of the automobile provided with a reinforcing member arranged within each closed section of a pair of side sills, which are extendedly arranged at both sides of a floor and in a longitudinal direction of a vehicle body, so as to correspond to end portions of floor cross members extendedly arranged on an upper surface of the floor in a widthwise direction of the vehicle body.

SUMMARY OF THE INVENTION

However, according to studies conducted by the present inventors of the present invention, in such a structure, installation of reinforcing members ensures rigidity in a part corresponding to end portions of floor cross members of side sills. However, at the time of a side collision of a vehicle, if a side collision load is inputted in the side sill between a pair of front and rear floor cross members, the side sill is possibly deformed by bending toward the inside in a widthwise direction of a vehicle body in a V-shape in plan view.

When the side sill is thus deformed by bending toward the inside in the widthwise direction of the vehicle body in a V-shape in plan view, it is impossible to expect a large absorbing quantity of collision energy, and the side sill is largely advanced to the inside of a vehicle cabin.

After such studies conducted by the present inventors, the present invention has been completed, and an object of the present invention is to provide a vehicle body floor structure of an automobile capable of increasing the absorbing quantity of collision energy through the side sill at the time of the side collision of the vehicle, thereby suppressing the advancement of the side sill to the inside of the vehicle cabin.

In order to attain such an object, in one aspect of the present invention, a vehicle body floor structure, comprising: a floor, a side sill extendedly arranged at a side of the floor and in a longitudinal direction of a vehicle body to have a closed section; a pair of floor cross members extendedly arranged on the floor in a widthwise direction of the vehicle body, so as to face with each other in the longitudinal direction of the vehicle body, and a first reinforcing member, provided between the pair of floor cross members in the longitudinal direction of the vehicle body and within the closed section of the side sill, to exhibit property allowing a dimensional condition thereof to be maintained against a side collision load.

In other words, in another aspect of the present invention, a vehicle body floor structure comprising: a floor, a side sill extendedly arranged at a side of the floor and in a longitudinal direction of a vehicle body to have a closed section; a pair of floor cross members extendedly arranged on the floor in a widthwise direction of the vehicle body, so as to face with each other in the longitudinal direction of the vehicle body; and reinforcing means for reinforcing the side sill provided between the pair of floor cross members in the longitudinal direction of the vehicle body and within the closed section of the side sill, the reinforcing means exhibiting property allowing a dimensional condition thereof to be maintained against a side collision load.

Other and further features, advantages, and benefits of the present invention will become more apparent from the following description taken in conjunction with the following drawings.

DETAILED DESCRIPTION OF THE PREFERRED EMBODIMENT

A vehicle body floor structure of an embodiment according to the present invention will be explained in detail with reference to FIGS. 1 to 4.

Figure 1:
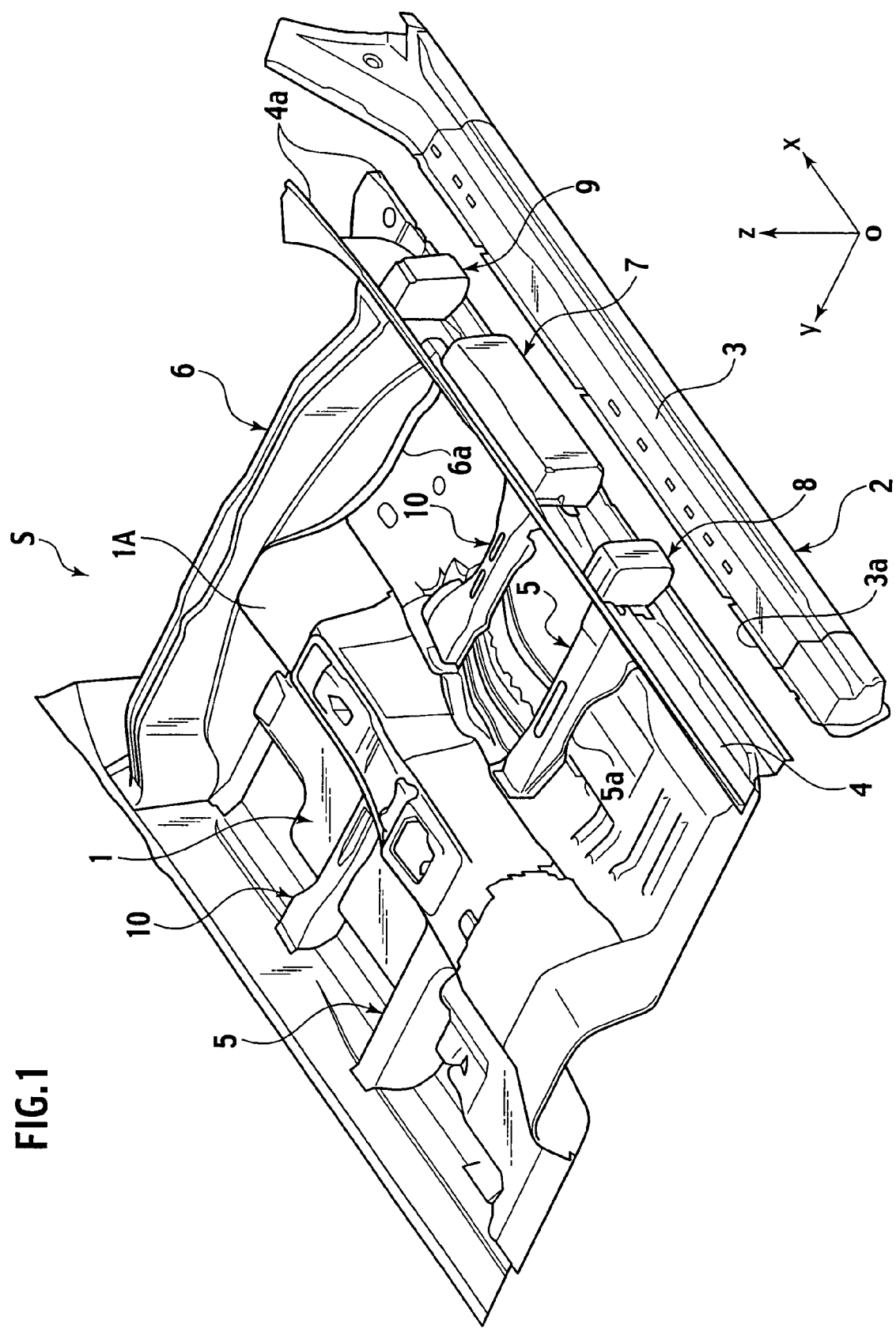
FIG. 1 is an exploded perspective view of a vehicle body floor structure showing an arranging state of reinforcing members of an embodiment according to the present invention.
Figure 2:
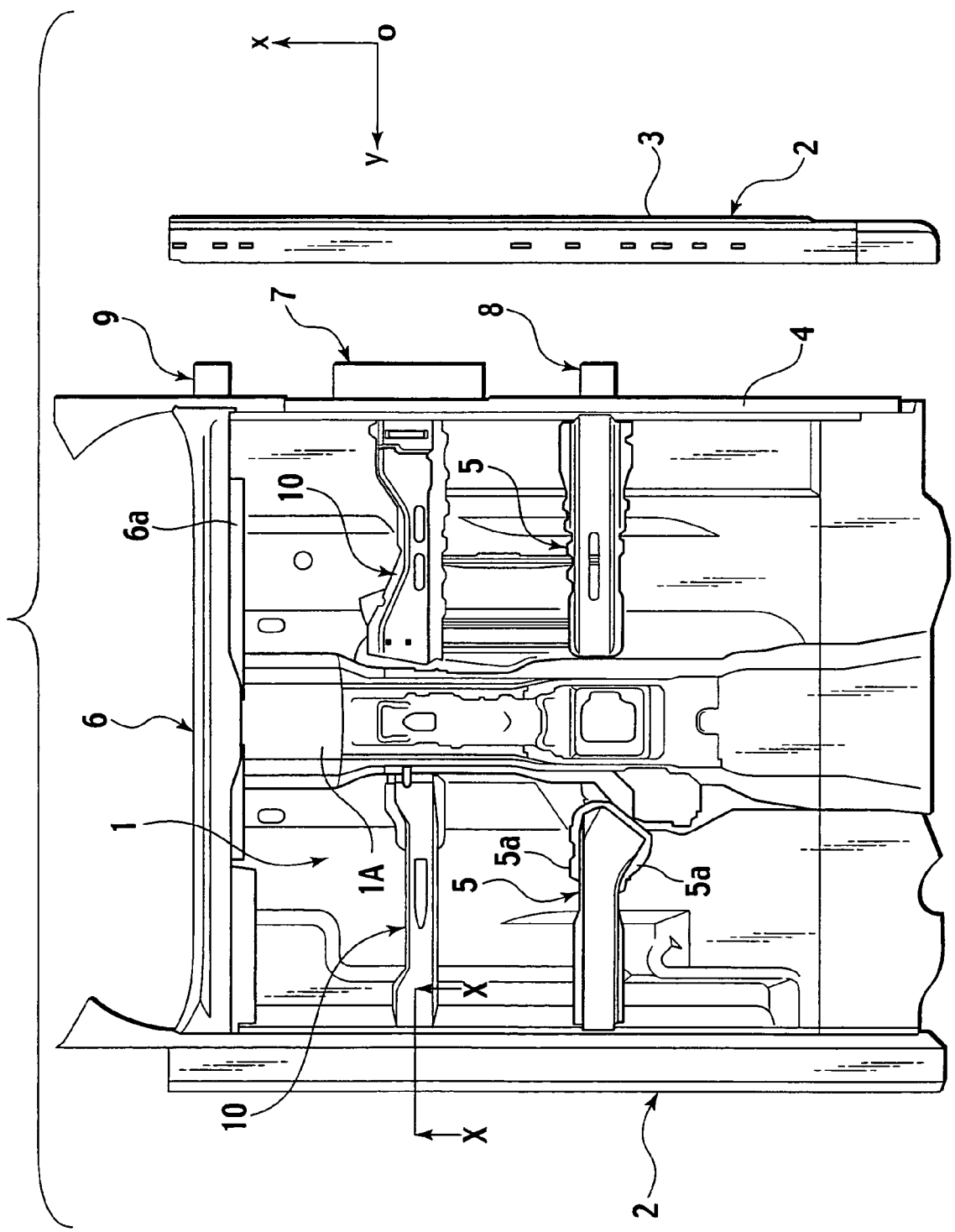
FIG. 2 is a plan view of FIG. 1.
Figure 3:
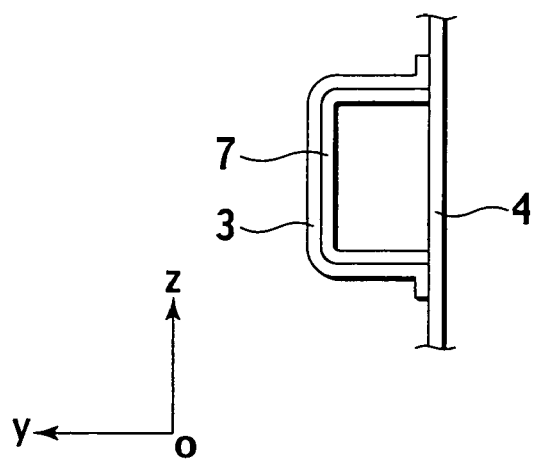
FIG. 3 is a sectional view taken along the line X—X of FIG. 2.
Figure 4:
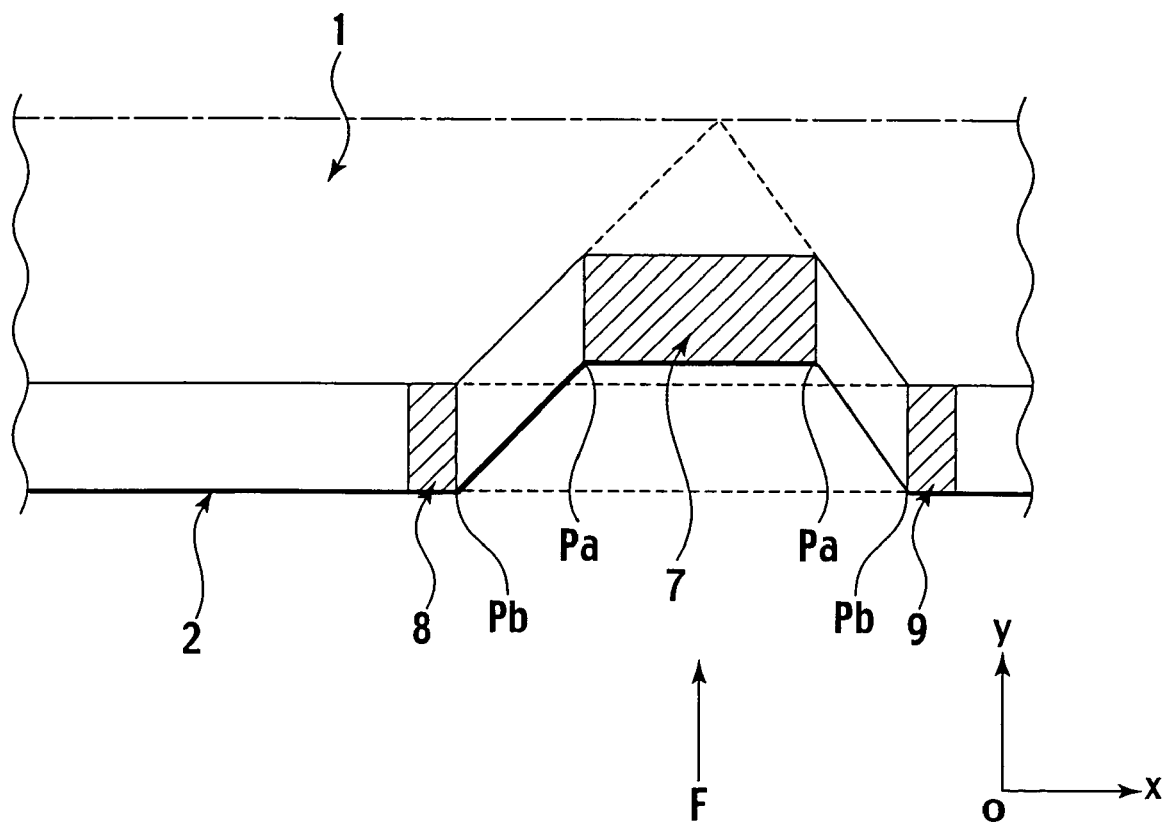
FIG. 4 is a plan model view showing a deformation mode of a side sill at the time of a side collision in a vehicle of the presently filed embodiment.

FIG. 1 is an exploded perspective view of a vehicle body floor structure showing an arranging state of reinforcing members of the presently filed embodiment, FIG. 2 is a plan view of FIG. 1, FIG. 3 is a sectional view taken along the line X—X of FIG. 2, and FIG. 4 is a plan model view showing a deformation mode of a side sill at the time of a side collision in a vehicle of the presently filed embodiment. Incidentally, note that x, y, z axes in the figures form the orthogonal 3-axes coordinate system.

As shown in FIGS. 1 and 2, a vehicle body floor structure S of the presently filed embodiment is provided with a pair of side sills 2 arranged on both sides of a floor panel 1 in a widthwise direction of a vehicle body (in a direction of y-axis), while extending in a longitudinal direction of the vehicle body (in a direction of x-axis). Incidentally, note that as a matter of convenience, in FIG. 1, only one of the side sills 2 is shown in an exploded state. Meanwhile, in FIG. 2, one of the side sills 2 is shown in an attached state, and the other side sill 2 is shown in the exploded state.

The side sill 2 forms a frame member of a floor side in the longitudinal direction of the vehicle body, by joining flanges 3a and 4a of upper and lower edges of a sill outer 3 and a sill inner 4 respectively, so as to have the closed section.

On an upper surface of the floor panel 1 are provided with a pair of front and rear floor cross members 5 and 6, extendedly arranged in the widthwise direction of the vehicle body.

Each of the floor cross members 5 and 6 is formed so as to have a hut cross section opened in a downward direction of the vehicle body (in a negative direction of z-axis). Flanges 5a and 6a of the lower ends of the floor cross members 5 and 6 are jointed with the floor panel 1. Also, end portions of the floor cross members 5 and 6 formed outside in the widthwise direction of the vehicle body and the sill inner 4 of the corresponding side sill 2 are butt-jointed to form the frame member having a closed section in the widthwise direction of the vehicle body. The floor cross member 5 is actually divided into right and left by a floor tunnel 1A, and end portions of the right and left components of the floor cross member 5, at the inside in the widthwise direction of the vehicle body, are respectively connected with the corresponding side portions of the floor tunnel 1A.

In this condition, a reinforcing member 7 is formed within the closed section of the side sill 2 between the pair of front and rear floor cross members 5 and 6. Here, the reinforcing member 7 has strength capable of maintaining its shape against the expected side collision load without substantially collapsing.

Also, the reinforcing members 8 and 9 having the mechanical properties set as the reinforcing member 7 are provided within the closed section of the side sill 2 at the places corresponding to the end portions of the pair of floor cross members 5 and 6. Here, the reinforcing member 7 is located in an intermediate position between the reinforcing members 8 and 9.

More specifically, as shown in FIG. 3 typically explaining for the reinforcing member 7, all of the reinforcing members 7, 8, and 9 are respectively structured in the same manner, with shapes along the closed section of the side sill 2, that is, with sections that occupy almost the entire region of the closed section of the side sill 2, so as to be formed in approximately rectangular box shapes. When assembling, the reinforcing members 7, 8, and 9 are previously jointed and arranged on the side face of the sill inner 4 already jointed with the side part of the floor panel 1. Then, the sill outer 3 is jointed with the sill inner 4 to thereby include the reinforcing members 7, 8, and 9 in the sill inner 2. Incidentally, note that the lengths of the reinforcing members 7, 8, and 9 in the longitudinal direction of the vehicle body are set in consideration of various conditions such as input loads. Also, from the viewpoint of deforming quantity of the side sill 2 toward the widthwise direction of the vehicle body at the time of side collision, it is preferable to set the length of the reinforcing member 7 in the longitudinal direction of the vehicle body not to be less than about ¼ of the length between points Pb in FIG. 4 as will be described later. Moreover, if considering the viewpoint of ensuring deformation mode of the side sill 2, it is preferable to set the length of the reinforcing member 7 in the longitudinal direction of the vehicle body to be longer than each length of the reinforcing members 8 and 9 in the longitudinal direction of the vehicle body.

In addition, in the same way as the floor cross member 5 of a front part, a floor cross member 10, divided into right and left components in such a way as crossing the sill inner 4 and the side part of a floor tunnel 1A, is arranged on the floor panel 1 in the intermediate position between the pair of cross members 5 and 6 in the widthwise direction of the vehicle body. Incidentally, the reinforcing member 7 is located to correspond to each outside end of the floor cross member 10.

Next, operation of the vehicle body floor structure thus constructed will be explained in detail.

As shown in FIG. 4, when a collision load F is inputted in a side sill 1 between the pair of floor cross members 5 and 6 by the side collision of the vehicle, the side sill 2 is displaced by deforming toward the inside in the widthwise direction of vehicle body, with the end portions of the pair of floor cross members 5 and 6 as fulcrums.

At this time, the reinforcing member 7 having a required length and capable of maintaining its shape against the input load F is provided in the longitudinal direction of the vehicle body within the closed section of the side sill 2, and in addition, the reinforcing members 8 and 9 are provided so as to be intervened with the reinforcing member 7. This allows the side sill 2 to advance to the inside in the widthwise direction of the vehicle body, specifically, to the inside of the vehicle cabin while deforming with bending in two stages so as to form a trapezoidal shape in plan view. Here, front and rear ends of the reinforcing member 7 are set as bending points Pa, a rear end of the reinforcing member 8 is set as the bending point Pb and a front end of the reinforcing member 9 is set as the bending point Pb, respectively, and also the sectional deformation of the part where the reinforcing member 7 is arranged can be suppressed.

By the bending and deforming of the side sill 2 in two stages in the trapezoidal shape as described above, the bending points are increased by existing as Pa in front and rear ends of the reinforcing member 7, in addition to Pb corresponding to each end portion of the floor cross members 5 and 6. This contributes to increasing the energy absorbing quantity thorough such bend and deformation of the side sill 2.

Further, by such bend and deformation of the side sill 2 in the trapezoidal shape as described above, quantity of the advancement of the side sill 2 to the inside of the vehicle cabin can be suppressed to be small, and occupant space in the vehicle cabin can therefore be ensured, compared with the general side sill having a property of bending and deforming in a V-shape as shown by chain double-dashed lines in FIG. 4.

In addition, by providing the reinforcing members 8 and 9 in the parts corresponding to the end portions of the pair of floor cross members 5 and 6 within the closed section of the side sill 2, the sectional deformation of the side sill 2 in the parts corresponding to the end portions of the floor cross members 5 and 6 can be suppressed at the time of side collision. This contributes to increasing reaction force when the side sill 2 is bent-deformed in the trapezoidal shape, thereby further increasing the energy absorbing quantity.

According to the present invention, at the time of the side collision of the vehicle, when the collision load is inputted in the side sill between the pair of front and rear floor cross members, the side sill is deformed and displaced toward the inside in the widthwise direction of the vehicle body, with the end portions of the pair of floor cross members as fulcrums. At this time, the above-described one or more reinforcing members having the required length and capable of maintaining the morphological property against the input load, are provided within the closed section of the side sill in the longitudinal direction of the vehicle body. Therefore, the sectional deformations of the parts, where the reinforcing members are arranged, are suppressed, with fore and rear ends of the reinforcing members and the parts corresponding to the end portions of the pair of floor cross members as bending points respectively. Thus, the side sill is bent-deformed in two stages in approximately the trapezoidal shape in plan view, to advance to the inside of the vehicle cabin.

As described above, by the bending and deformation of the side sill in two stages in the trapezoidal shape, the bending points are increased. Then, with such an amount of the increase, the energy absorbing quantity is accordingly increased, and also the amount of the advancement of the side sill to the inside of the vehicle cabin can be suppressed to be small, compared with the side sill having the property of bending and deforming in the V-shape.

The entire content of a Patent Application No. TOKUGAN 2004-057969 with a filing date of Mar. 2, 2004 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle body floor structure comprising:
   a floor
   a side sill extendedly arranged at a side of the floor and in a longitudinal direction of a vehicle body to have a closed section;
   a pair of floor cross members extendedly arranged on the floor in a widthwise direction of the vehicle body, so as to face with each other in the longitudinal direction of the vehicle body; and
   a first reinforcing member, provided between the pair of floor cross members in the longitudinal direction of the vehicle body and within the closed section of the side sill, to exhibit a property allowing a dimensional condition thereof to be maintained against a side collision load,
   wherein the side sill is formed with an inner member and an outer member having a hut section, and the closed section of the side sill is formed by joining the inner member and the outer member with each other, and
   wherein the first reinforcing member has a closed section formed by closing the first reinforcing member with respect to the inner member of the side sill.

2. The vehicle body floor structure according to claim 1, wherein the property of the first reinforcing member is set in consideration of a deformation mode of the side sill, when impact force is applied on the side sill toward the vehicle widthwise direction.

3. The vehicle body floor structure according to claim 1, wherein a shape of the first reinforcing member is formed along the closed section of the side sill.

4. The vehicle body floor structure according to claim 1, wherein the inner member of the side sill is a flat plate-like member.

5. The vehicle body floor structure according to claim 1, further comprising:
   a second reinforcing member provided within the closed section of the side sill, so as to correspond to one of the end portions of the pair of floor cross members in the vehicle widthwise direction; and
   a third reinforcing member provided within the closed section of the side sill, so as to correspond to the other of the end portions of the pair of floor cross members in the vehicle widthwise direction.

6. The vehicle body floor structure according to claim 5, wherein the first reinforcing member is located between the second reinforcing member and the third reinforcing member in the longitudinal direction of the vehicle body.

7. The vehicle body floor structure according to claim 5, wherein a length of the first reinforcing member in the longitudinal direction of the vehicle body is set in consideration of a length between the second reinforcing member and the third reinforcing member.

8. The vehicle body floor structure according to claim 5, wherein the first reinforcing member, the second reinforcing member, and the third reinforcing member control a deformation mode of the side sill in cooperation with each other, when impact force is applied on the side sill toward the widthwise direction of the vehicle body.

9. A vehicle body floor structure comprising:
   a floor;
   a side sill extendedly arranged at a side of the floor and in a longitudinal direction of a vehicle body to have a closed section;
   a pair of floor cross members extendedly arranged on the floor in a widthwise direction of the vehicle body, so as to face with each other in the longitudinal direction of the vehicle body; and
   reinforcing means for reinforcing the side sill provided between the pair of floor cross members in the longitudinal direction of the vehicle body and within the closed section of the side sill, the reinforcing means exhibiting a property allowing a dimensional condition thereof to be maintained against a side collision load,
   wherein the side sill is formed with an inner member and an outer member having a hut section, and the closed section formed by joining the inner member and the outer member with each other, and
   wherein the reinforcing means has a closed section formed by closing the first reinforcing member with respect to the inner member of the side sill.

* * * * *